United States Patent

[11] 3,617,885

[72] Inventor Desmon Wheable
Farnborough, England
[21] Appl. No. 708,652
[22] Filed Feb. 27, 1968
[45] Patented Nov. 2, 1971
[73] Assignee The Solartron Electronic Group Limited
Farnborough, England
[32] Priority Mar. 1, 1967
[33] Great Britain
[31] 9743/67

[54] DIGITAL VOLTMETERS
9 Claims, 4 Drawing Figs.

[52] U.S. Cl. .......... 324/99 D, 324/115, 340/347 AD
[51] Int. Cl. .......... G01r17/06, G01r 15/08
[50] Field of Search .......... 324/99, 99 D, 115; 340/347 AD; 328/48

[56] References Cited

UNITED STATES PATENTS

| | | | |
|---|---|---|---|
| 2,551,681 | 5/1951 | Lawrence, Jr. et al. | 328/48 X |
| 2,710,397 | 6/1955 | Foster | 324/99 X |
| 3,316,547 | 4/1967 | Amman | 324/99 X |
| 3,051,939 | 8/1962 | Gilbert | 324/99 X |
| 3,201,781 | 8/1965 | Holland | 324/99 X |

OTHER REFERENCES

Tow, J. T., Digital and Sampled-data Control Systems; McGraw-Hill Book Co., Inc., 1959, copy in Sci. Lib.

Electronic Design, Vol. 6, No. 2, Jan. 22, 1958, pages 44 and 45, copy in Sci. Lib.

*Primary Examiner*—Rudolph V. Rolinec
*Assistant Examiner*—Ernest F. Karisen
*Attorneys*—William R. Sherman, Stewart F. Moore and Jerry M. Presson

ABSTRACT: In a dual ramp digital voltmeter an input voltage is integrated for a standard number of clock pulses to ramp up the integrator output and then an opposing reference voltage is integrated to ramp down the integrator output to datum level again, the number of clock pulses during the ramp down being counted. In the present invention the clock pulse rate can be selectively varied in the ramp up or ramp down interval so as to effect range switching. Alternatively or additionally the clock pulse rate can be selectively varied as between different segments of the ramp down interval so as to yield a nonlinear relationship between the input voltage and the number of clock pulses counted during the ramp down.

INVENTOR.
Desmond Wheable
BY J M. Presson
ATTORNEY

DIGITAL VOLTMETERS

INTRODUCTION

This invention relates to digital voltmeters (analogue to digital converters) of the type which will hereinafter be called a dual ramp voltmeter. By this is meant a digital voltmeter comprising an integrating means, a source of clock pulses, a pulse counter and control logic responsive thereto to cause the input voltage V initially to be applied to the integrating means for a standard number M of clock pulses to generate an output ramp (ramp up) commencing from a datum value and then to cause an opposing reference voltage U to be applied for an interval of time sufficient to restore the output to the datum value (ramp down) and to cause the counter to count the number N of clock pulses in the said interval. It is readily seen that the ratio of the input voltage to the reference voltage corresponds to the ratio of the clock pulses N counted in the said interval to the standard number M of clock pulses. All quantities are known except the input voltage which is thus measured. Advantages of the dual ramp voltmeter are that the ramps are generated by the same amplifier so that nonlinearity errors cancel and only one counter is needed.

It will be understood that the terms ramp up and ramp down are used with the meanings assigned above without implying that the ramp up is necessarily a positive-going voltage; it can be a negative-going voltage, in which case the ramp down is positive-going.

The problem with which the invention is mainly concerned is that of effecting range switching. Voltmeters are almost invariably required to be able to handle more than one input voltage range.

PRIOR ART

In known dual ramp voltmeters range switching is achieved by providing switched input resistors. There is one calibrated range and the other ranges depend for their accuracy upon the accuracy of the input resistors. The value of these resistors can change however (with temperature or with age), and so upset the accuracy of the instrument, and thermal e.m.f.'s can be generated across the relay contacts usually used to switch in the different resistors.

OBJECTS

One object of the invention is to overcome the problem discussed in the preceding paragraph. Another object is to enable a nonlinear relationship to be set up between the input voltage V and the number of clock pulses N.

THE INVENTION

Broadly speaking the present invention provides a dual ramp digital voltmeter as defined above further comprising a switched dividing arrangement interposed between the source of clock pulses and the counter, whereby the rate of pulses supplied to the counter can be selectively varied.

In order to provide range switching the switched dividing arrangement can be made responsive to the control logic to vary the said rate of pulses as between the ramp up interval in which the input voltage is applied and the ramp down interval in which the reference voltage is applied to the integrating means. If the ratio of the ramp up pulse rate to the ramp down pulse rate is changed, the measurement range of the voltmeter is obviously changed.

It will be shown that there is particular advantage in making the rate lower during the ramp up interval than in the ramp down interval.

The change of rate of pulses supplied to the counter need not be made at the instant of changeover from the ramp up to the ramp down. A change can be made at one or more predetermined clock pulse counts during the ramp down. Clearly then, there will be a nonlinear relationship between V and N and use of this may be made to linearize a nonlinear measurement, i.e. if V is a nonlinear function of a variable, the voltmeter can be linearized to make N a linear function of the variable.

DRAWINGS

The invention will be described in more detail, by way of example, with reference to the accompanying drawings in which FIG. 1 is a block diagram of one embodiment, FIG. 2 is an explanatory diagram, FIG. 3 is a more detailed block diagram, and FIG. 4 is a block diagram of a linearizing digital voltmeter.

DETAILED DESCRIPTION

Figure 1:
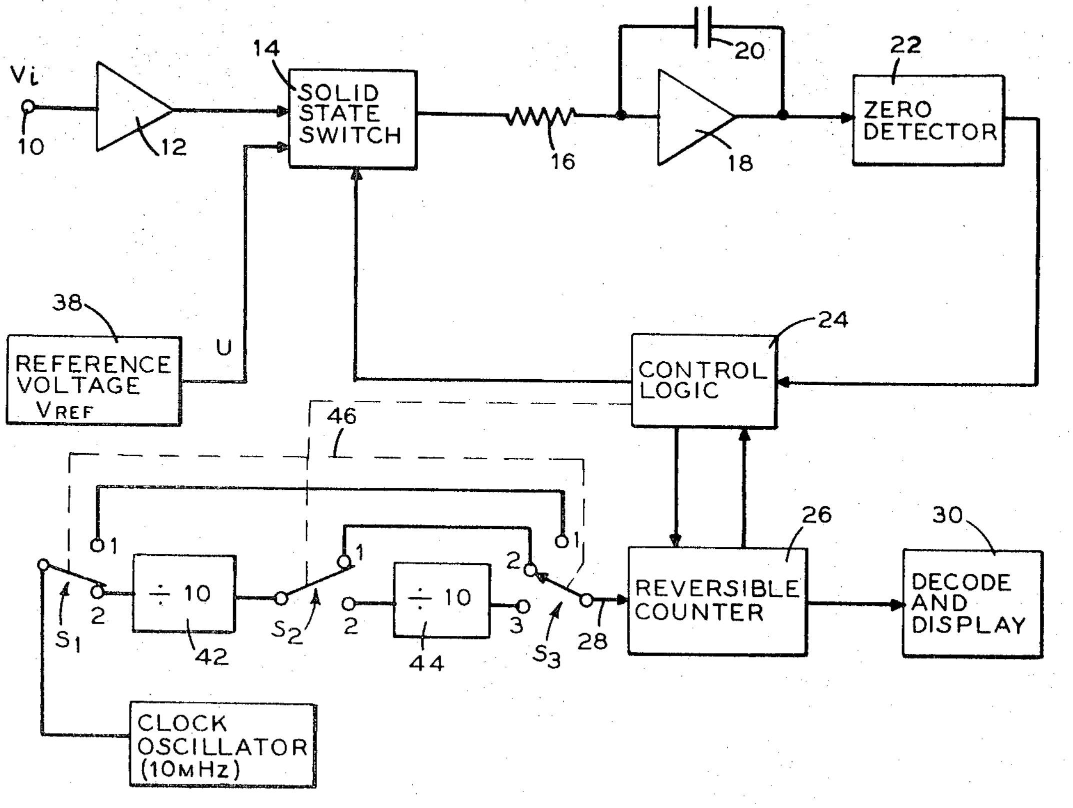

In FIG. 1 an input terminal 10 is connected through an input amplifier 12, a solid-state switch 14 and an input resistor 16 to an integrating amplifier 18 having a feedback capacitor 20. The output of the amplifier is applied to a zero detector 22 (e.g. a Schmitt trigger circuit) whose output forms one input to the control logic 24 which operates the switch 14. The logic is also coupled to a counter 26 which receives pulses at its input 28. The number in the counter is decoded and displayed by a unit 30.

Figure 2:
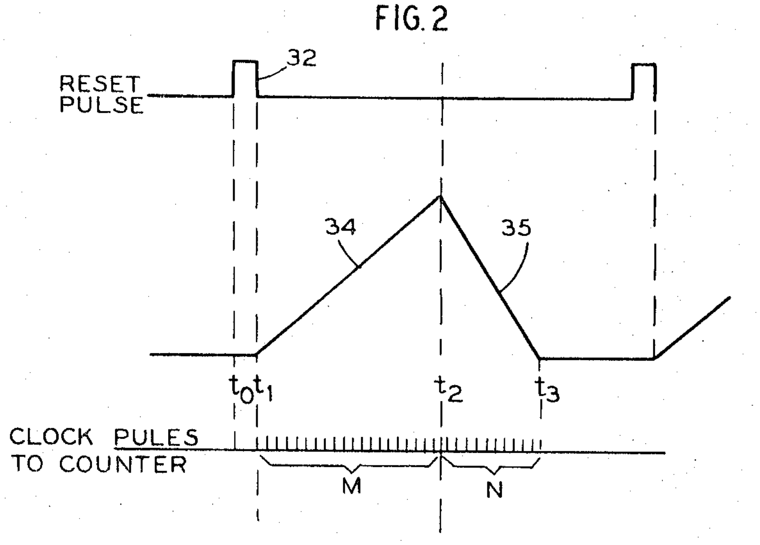

As so far described the voltmeter is conventional and hence no details are given at this stage of the control logic. Briefly however, operation is as follows. A reset pulse 32 (FIG. 2) sets the counter 26 to zero to $t_0$. At the trailing edge ($t_1$) of this pulse the logic operates the switch 14 to apply the input voltage V to the amplifier 18 and the ramp 34 (FIG. 2) is generated with a slope proportional to V. During this interval the counter 26 is counted up to full house (say 19,999) and then one further pulse resets the counter to zero at $t_2$, causing the logic to operate the switch 14 to connect a reference voltage U from source 38 to the amplifier 18 in place of V. The counter starts to count and U generates a descending ramp 36 with slope proportional to U. When the amplifier output voltage returns to zero at $t_3$ the measurement is complete and the logic 24 responds to the detector 22 to stop the counter. The number N now held in the counter and displayed by the unit 30 is a measure of V in accordance with the relationship $N=MV/U$ where $M$ is the standard number of pulses counted from $t_1$ to $t_2$, assuming the amplifier 12 to have unity gain. $U$ can be a voltage of the opposite sign to $V$. Alternatively both can have the same sign and U can be arranged to oppose V by applying them to the two inputs respectively of a differential amplifier.

In order to avoid mains jitter problems the pulse 32 is synchronized with mains frequency and it is arranged that $t_2 - t_1$ is equal to an integral number (preferably 1) of mains periods (i.e. 20 ms. for 50-Hz. frequency). This technique is well known.

In known voltmeters different measurement ranges are selected by varying the gain of the operational amplifier 12 by means of a range switch which selects different values of resistance to vary the ratio of amplifier feedback resistance to input resistance. However, for a limited range of input voltages determined by the dynamic range of the amplifier, the present invention enables this potential source of error to be omitted. In contrast to the prior art the pulses at the counter input 28 are not taken straight from the clock oscillator 40 but an arrangement of dividers 42 and 44 and switches $S_1$, $S_2$ and $S_3$ is interposed. The dividers are shown as decade dividers since decade ranges are customarily required. The table below gives the pulse frequencies at the terminal 28 at three different settings I, II and III of the switches, the switch positions being identified in FIG. 1:

| | $S_1$ | $S_2$ | $S_3$ | Setting |
|---|---|---|---|---|
| Frequency undivided | 1 | | 1 | I |
| Divided by 10 | 2 | 1 | 2 | II |
| Divided by 100 | 2 | 2 | 3 | III |

The oscillator 40 has a frequency 10 times higher than it would have in a conventional voltmeter and for a measurement in the basic (calibrated) range of the meter, setting II is used throughout the measurement, so that the pulses at terminal 28 have the conventional frequency, e.g. 20,000 pulses in 20 ms. or 1 MHz. This gives the above-described range of $$N=MV/U.$$

For measurement in a range one-tenth the size of the basic range, setting II is used up to time $t_2$ (FIG. 2) and thereafter setting I is used. To this end the switches $S_1$, $S_2$ and $S_3$ are also operated from the control logic 24 as is illustrated by broken line connections 46. Mechanical switches are shown for ease of explanation of the circuit but in practice solid-state switches would be used on account of their speed.

The pulses counted in $t_2$ to $t_3$ are therefore 10 times more than in the basic range and the voltmeter sensitivity is increased tenfold, the measurement relationship becomes $$N=10MV/U.$$

In a similar manner, a range one-hundredth the size of the basic range is obtained by using setting III up to $t_2$ and thereafter setting I.

Hence $N=100MV/U$.

The calibrated accuracy of the basic range can be maintained through all ranges since the dividers 42 and 44 are essentially digital devices, preferably being solid-state scaling circuits.

There is considerable advantage in using a higher pulse rate in the measurement interval $t_2$ to $t_3$ than in the sampling interval $t_1$ to $t_2$, irrespective of whether the dividers are used to effect range switching. This advantage consists in increasing the overall speed of operation of the voltmeter. As already explained the sampling interval has to be equal to the mains period (*20* ms.) or a multiple thereof in order to obtain maximum series mode rejection. In a conventional voltmeter, the measurement interval for a full scale reading equals the sampling interval, giving a total digitization time of at least 40 ms. In practice sampling cycles can be triggered only once every 60 ms., i.e. approximately 17 readings per second. The present invention enables the measurement interval to be reduced without decreasing the numerical resolution of the voltmeter since the clock pulse rate is also increased in this interval. Obviously U must be increased by the same factor in order to restore the ramp 36 to zero within the capacity of the counter.

For example let a single 4 divider be used; the total digitization time is now [20+(20.4) ]=25 ms. which makes it perfectly easy to trigger a sampling cycle every 40 ms., i.e. 25 readings per second.

Figure 3:
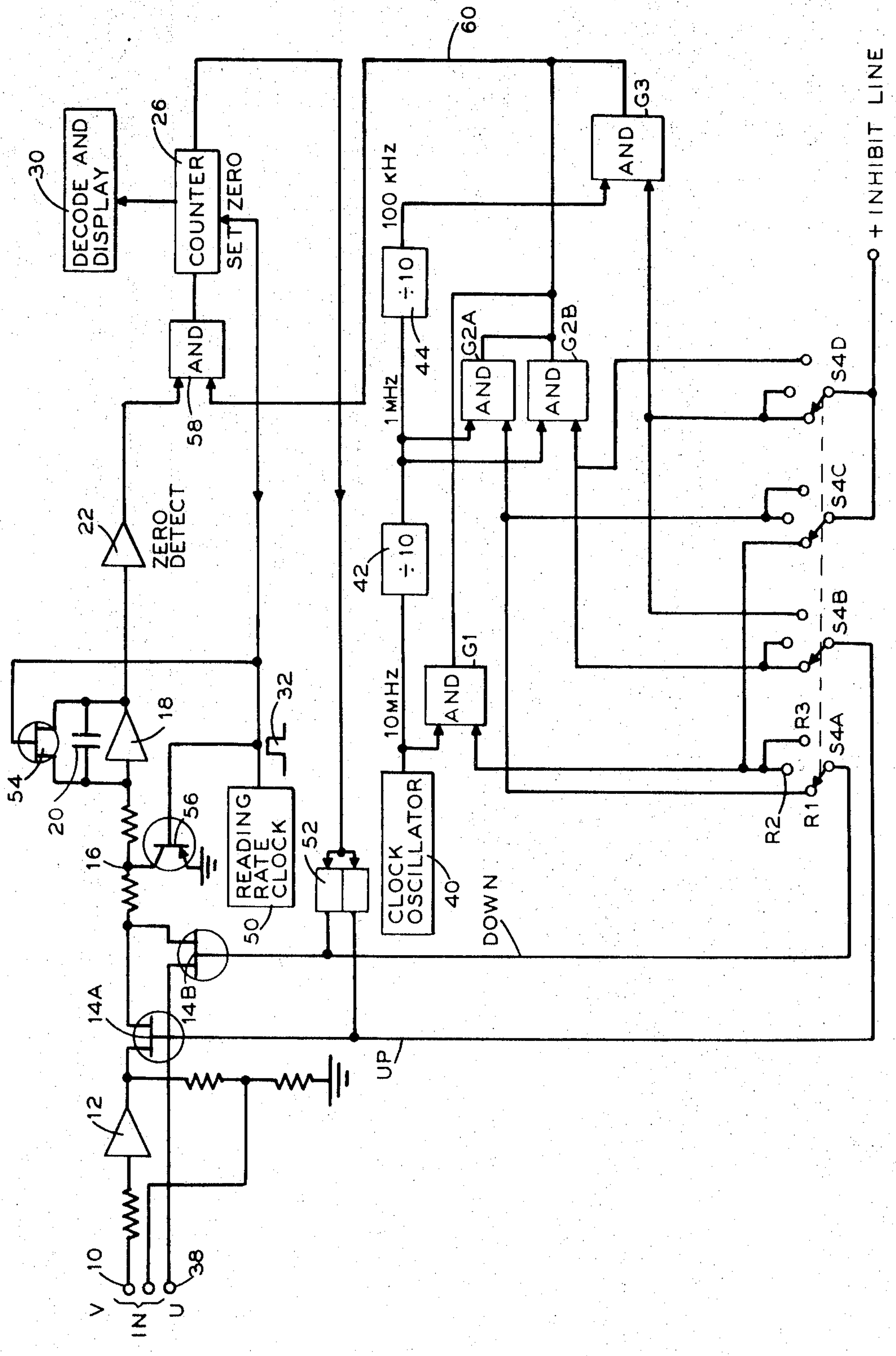

FIG. 3 is a more detailed showing of the voltmeter of FIG. 1. The control logic shown previously as block 24 consists essentially of a reading rate clock source 50, which supplies the pulses 32, e.g. at a repetition rate of 25 Hz., a bistable multivibrator 52 and AND gates G1, **G2*a***, *G2b* and G3 which take over the function of switches S1, S2 and S3 in conjunction with a range switch S4*a*, *b*, *c*, *d*.

The pulses 32 from the clock source 50 set the counter 26 to zero, and clear the integrating amplifier 18 by switching on an FET 54 shunting the capacitor 20 and an input earthing transistor 56.

Every time the counter 26 goes to zero the state of the bistable 52 changes. When the counter is set to zero by the pulse 32 the bistable switches to the state in which a line labeled UP is true and switches on an FET 14*a* to apply V to the integrating amplifier 18. When the counter overflows to zero at time $t_2$ the bistable switches to the state in which a line labeled DOWN is true and switches on an FET 14*b* to apply U to the amplifier 18. The FET's 14*a* and 14*b* together make up the switch 14 of FIG. 1. The zero detector 22 controls an AND gate 58 through which the clock pulses on a line 60 pass to the counter 26. The pulses on line 60 either come direct from the oscillator (10 MHz.) through the gate G1 or via the divider 42 (1 MHz.) through the gate G2*a* or G2*b* or via via both the dividers 42 and 44 (100 kHz.) through the gate G3. Which of the gates is opened is determined by the signals on the UP and DOWN lines in conjunction with the range switch.

The range switch has four ganged poles **S4*a*, S4*b*, S4*c* and S4*d* and three ways R1, R2 and R3 as identified against S4*a* and corresponding respectively to the basic measuring range, the tenth scale range and the hundredth scale range. S4*a* and S4*b* control the application of the DOWN and UP line signals respectively and S4*c* and S4*d*** are used to apply overriding, positive inhibit signals to the gates.

It will readily be seen that the logic causes the settings I, II and III to be selected as summarized in the following table:

| | S4*a* | S4*b* | S4*c* | S4*d* | Setting |
|---|---|---|---|---|---|
| Basic range R1: | | | | | |
| (i) Ramp up ($t_1$–$t_2$) | G2*a* closed | G2*b* OPEN | G1 closed | G3 closed | II |
| (ii) Ramp down ($t_2$–$t_3$) | G2*a* OPEN | G2*b* closed | G1 closed | G3 closed | II |
| Tenth scale range R2: | | | | | |
| (i) Ramp up | G1 closed | G2*b* OPEN | G2*a* closed | G3 closed | II |
| (ii) Ramp down | G1 OPEN | G2*b* closed | G2*a* closed | G3 closed | I |
| Hundredth scale range R3: | | | | | |
| (i) Ramp up | G1 closed | G3 OPEN | G2*a* closed | G2*b* closed | III |
| (ii) Ramp down | G1 OPEN | G3 closed | G2*a* closed | G2*b* closed | I |

Figure 4:
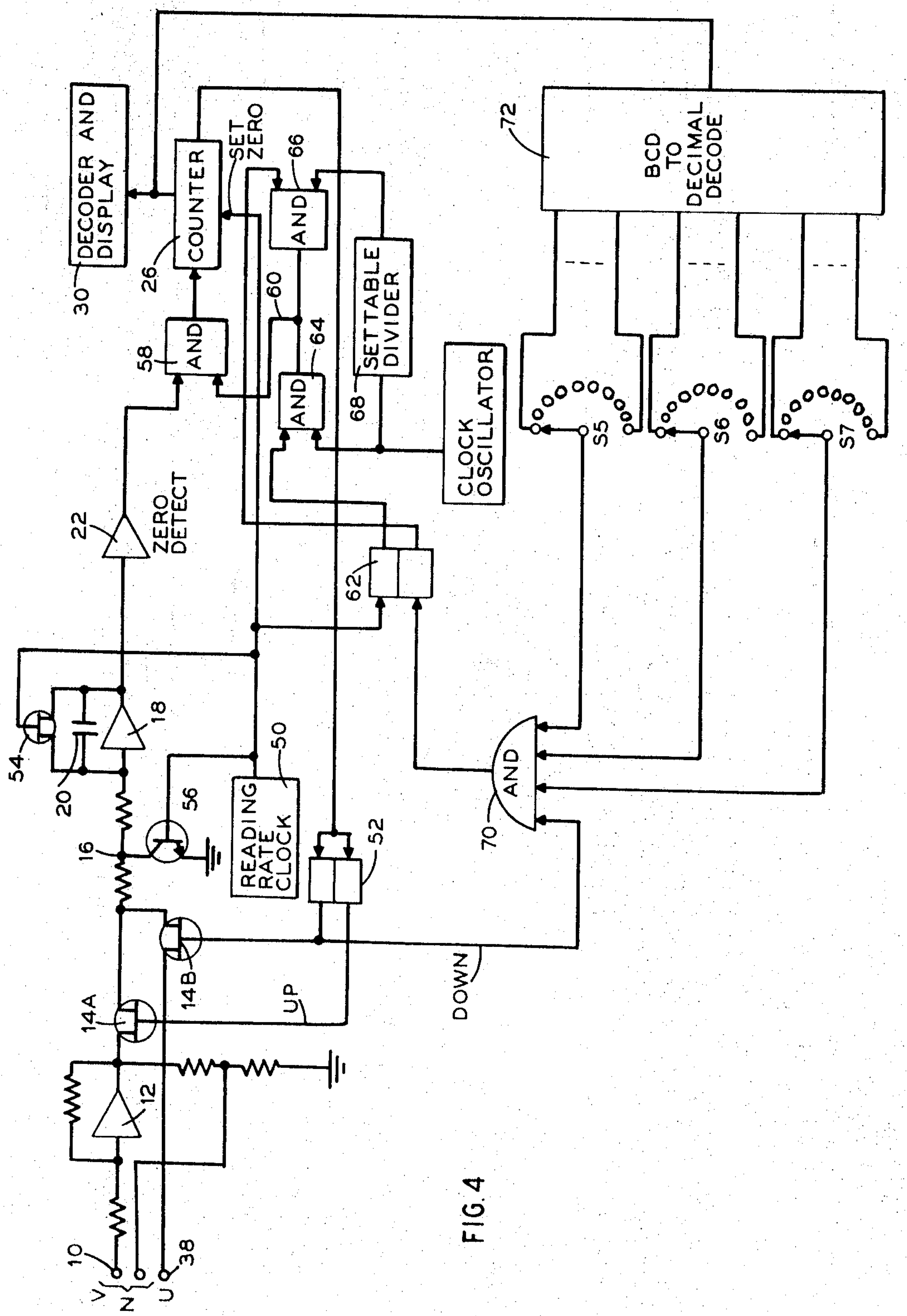

Turning now to FIG. 4, there is no reason why the switching from one pulse rate on the line 60 to another should be restricted to occurring at time $t_2$ and if switching is effected at one or more times subsequent to $t_2$, such times being determined by particular counts in the counter 26, it will be readily apparent that a nonlinear relationship between N and V will obtain. By way of illustration an arrangement using one breakpoint only is illustrated in FIG. 4.

Here the bistable 52 does not cause any change in the rate of the pulses on line 60 at time $t_2$ but another bistable multivibrator 62 is provided. This is set to one state by the pulse 32 to open a gate 64 and allow pulses to pass direct from the clock oscillator 40 to the line 60. When the bistable 62 is set to its other state the gate 64 closes and a gate 66 opens to pass pulses to the line 60 by way of a divider 68 which can be set to give a desired divisor. Such setting of the bistable 62 takes place when a particular count is reached in the counter 26 but, in order that this will only take place during the ramp down the signal to the bistable 62 is provided by a multiinput AND gate 70 which includes among its inputs the DOWN line from the bistable 52.

The other inputs to the gate 70 are only all energized when the said particular count is held by the counter 26. In order to make this count selectively variable the counter is coupled to a BCD to decimal decoder 72 whose outputs in each of three decades can be selected by means of individually settable switches S5, S6 and S7 which provide the other inputs to the gate 70. In practice a single decoder can serve for blocks 30 and 72.

In operation the ramps 34 and 36 are generated as described before and shown in FIG. 2. At $t_2$ the counter 26 begins to count 10 MHz. clock pulses until it has counted the number selected by the setting of the switches S5 S6 and S7. Thereafter, until $t_3$ the counter counts pulses of reduced frequency, as determined by the setting of the settable divider 66. It is not necessary that the clock pulse frequency in line 60 should be reduced however; the logic could readily be modified to increase the frequency when the selected number is reached. It must be understood that the ramps 34 and 36 remain linear; it is the relationship between N and V which becomes nonlinear.

The said selected number determines a breakpoint in the nonlinear function of N versus V. Clearly the principles of FIG. 4 can be extended to provide more breakpoints than one. Each breakpoint requires its individual set of switches S5, S6 and S7 and associated gate 70 and bistable 62. In addition the divider 68 and gates 64 and 66 must be replaced by a more complex programmed arrangement which selects the different required divisors as the bistables 62 are successively set.

In FIG. 3 the rate of clock pulses in line 60 is only switched at $t_2$ and in FIG. 4 the rate is only switched at the breakpoint subsequent to $t_2$. It will be readily apparent that the features of FIGS. 3 and 4 could be combined to provide switching both at $t_2$ (e.g. for range-switching purposes) and at one or more breakpoints subsequent to $t_2$ (for providing a nonlinear law relating N to V).

In principle the nonlinear relationship between N and V could also be obtained by switching the rate of the pulses in the line 60 at one or more breakpoints during the ramp up interval $t_1$ to $t_2$.

What is claimed is:

1. A dual ramp digital voltmeter responsive to an input voltage, said meter being of the type comprising an integrating means, a source of a reference voltage opposing the input voltage, a source of clock pulses, a pulse counter, control logic means responsive to said pulse counter for causing the input voltage initially to be applied to ramp up the integrating means from a datum level for a standard number of clock pulses and then for causing the opposing reference voltage to be applied to ramp down the integrating means during a measuring interval and for simultaneously causing the pulse counter to count the clock pulses, and means responsive to the return of said integrating means to datum level for terminating the measuring interval and pulse counting, wherein the improvement comprises dividing means interposed between said source of clock pulses and said pulse counter for dividing the pulse rate of pulses supplied to said counter, and means for varying the divisor introduced by said dividing means to vary selectively the repetition rate of the pulses supplied to the counter.

2. A voltmeter according to claim 1, wherein the said means for varying the divisor is responsive to the control logic to change the divisor at the instant of changing from ramp up to ramp down.

3. A voltmeter according to claim 2, further comprising range-setting means having a plurality of settings, said means for varying the divisor being further responsive to the range-setting means to provide different divisors in at least one of the ramp up and ramp down intervals for different ones of said settings, thereby to provide in the different settings different ratios of the repetition rates of the pulses supplied to the counter during the ramp up and ramp down intervals.

4. A voltmeter according to claim 1, wherein said means for varying the divisor is responsive to the pulse counter to change the divisor at the instant of at least one breakpoint corresponding to a particular count in the counter.

5. A voltmeter according to claim 4, comprising means for restricting changes of the divisor to a particular one of the ramp up and ramp down intervals.

6. A voltmeter according to claim 4, comprising means for restricting changes of the divisor to the ramp down interval.

7. A voltmeter according to claim 4, comprising means for selectively varying the particular count.

8. In a dual ramp digital voltmeter responsive to an input voltage and comprising an integrating means, a source of a reference voltage opposing the input voltage, a source of clock pulses, a pulse counter and control logic responsive thereto to cause the input voltage initially to be applied to ramp up the integrating means from a datum level for a standard number of clock pulses and then to cause the opposing reference voltage to be applied to ramp down the integrating means during a measuring interval and simultaneously to cause the pulse counter to count the clock pulses and means responsive to the integrating means returning to datum level to terminate the measuring interval and pulse counting, the improvement consisting in means responsive to a particular count being held in the pulse counter to alter the repetition rate of the pulses supplied to the counter.

9. An analog-to-digital converter comprising the combination of an integrating circuit having an input; a source of clock pulses; means for counting clock pulses from said source of clock pulses; a reference signal source; logic circuit means, including said means for counting clock pulses, for applying an analog signal to the input of said integrating circuit to cause said integrating circuit to ramp in a first direction for a selectable predetermined interval of time, and for subsequently applying the signal from said reference signal source to the input of said integrating circuit to cause said integrating circuit to ramp in a second direction to a datum level; means in said logic circuit means for causing said means for counting clock pulses to measure the time to ramp in said second direction; means responsive to the arrival of said ramp in said second direction at said datum level for providing, at the time of the arrival, the accumulated total in said means for counting clock pulses as a digital output representative of the value of the analog signal; and switch means for selectably altering the total number of pulses from said source of clock pulses needed to determine the interval of time occupied by said ramp in said first direction and for selectably altering the rate at which pulses are delivered from said source of clock pulses to said means for counting during the interval of time occupied by said ramp in said second direction.

* * * * *